(12) United States Patent
O'Brien

(10) Patent No.: US 8,634,309 B2
(45) Date of Patent: Jan. 21, 2014

(54) SECURITY NETWORK PROCESSOR SYSTEM AND METHOD

(75) Inventor: Eric David O'Brien, Leesburg, VA (US)

(73) Assignee: McAfee, Inc., Santa Clara, CA (US)

( * ) Notice: Subject to any disclaimer, the term of this patent is extended or adjusted under 35 U.S.C. 154(b) by 3660 days.

(21) Appl. No.: 10/617,970

(22) Filed: Jul. 10, 2003

(65) Prior Publication Data

US 2013/0247197 A1    Sep. 19, 2013

(51) Int. Cl.
| | |
|---|---|
| *G01R 31/08* | (2006.01) |
| *H04J 1/16* | (2006.01) |
| *H04L 12/26* | (2006.01) |
| *G06F 11/00* | (2006.01) |
| *G08B 23/00* | (2006.01) |

(52) U.S. Cl.
USPC .......................................... 370/252; 726/22

(58) Field of Classification Search
USPC ............................................ 370/252; 726/22
See application file for complete search history.

(56) References Cited

U.S. PATENT DOCUMENTS

| | | | | |
|---|---|---|---|---|
| 7,120,628 | B1 * | 10/2006 | Conmy et al. | 707/4 |
| 7,203,960 | B1 * | 4/2007 | Painter | 726/22 |
| 2002/0152327 | A1 | 10/2002 | Kagan et al. | 709/250 |
| 2002/0152328 | A1 | 10/2002 | Kagan et al. | 709/250 |
| 2003/0065856 | A1 | 4/2003 | Kagan et al. | 710/263 |
| 2003/0084326 | A1 * | 5/2003 | Tarquini | 713/200 |
| 2003/0145228 | A1 * | 7/2003 | Suuronen et al. | 713/201 |
| 2003/0204728 | A1 * | 10/2003 | Irwin | 713/176 |
| 2003/0212821 | A1 * | 11/2003 | Gillies et al. | 709/238 |

* cited by examiner

*Primary Examiner* — Xavier S. Wong
(74) *Attorney, Agent, or Firm* — Patent Capital Group

(57) ABSTRACT

A system, method and computer program product are provided for scanning data received from a computer network. Included is a central processing unit for processing data. Coupled between the central processing unit and a network is a network processor. Such network processor is capable of scanning data received from the network based on an update. Such network processor is further capable of receiving the update via the network.

22 Claims, 16 Drawing Sheets

SECURITY NETWORK PROCESSOR SYSTEM AND METHOD

FIELD OF THE INVENTION

The present invention relates to network computing, and more particularly to scanning data on a computer network.

BACKGROUND OF THE INVENTION

With the advent of the Internet, there is an increasing need to scan data received from un-trusted networks and servers prior to downloading the same. Such scanning is typically carried out by software executed utilizing a central processing unit (CPU) of the downloading computer. Of course, such software must share the computing resources of the CPU with other software application programs running on the computer.

As network connectivity and bandwidth improves, the amount of such data that can be downloaded (and thus must be scanned) can be quite considerable. For instance, in the context of downloading data utilizing hypertext transfer protocol (HTTP), a scanner may be required, for each "page" of data, to scan scripts, data, and various sub-files that may make up a typical page, generated utilizing hypertext mark-up language (HTML). Just by way of example, HTTP "get" verbs are often employed to reference as many as 50 or more pictures (i.e. gifs, tiffs, etc.).

Unfortunately, this requires the scanner to "drop" some data (without scanning the same) to prevent the scanning process from utilizing an amount of computing resources that is greater than that available.

To provide a solution for the foregoing problem, scanning techniques have been developed to afford a maximum amount of security while minimizing the amount of system resources used to provide such security. One example of such techniques is to conditionally scan files based on a type of file that is being released to a requestor. It is known that executable files and macro files are more susceptible to virus propagation with respect to data files, i.e. image files, text files, etc. As such, scanners have been configured to allow certain files such as data files to be released with less security measures than executable and macro files.

Unfortunately, such techniques are still inadequate to provide the resource-savings necessary for desired performance levels of computers of today. In response, solutions have been proposed where network scanning may be carried out in the context of a network interface circuit board or card (NIC) that collects network traffic and/or related information from a network. In a typical computer system interconnected to a network, a NIC acts as an interface between the CPU and a computer network. The NIC of the present solution performs the necessary interface functions for transmitting and receiving data over the computer network, as well as offloading some of the scanning tasks from the CPU.

While such scanning-equipped NIC's have, to a certain extent, addressed the need to offload CPU's, they have not incorporated the various features (i.e. the conditional scanning set forth hereinabove, etc.) that are utilized in the context of CPU-driven solutions. Moreover, there are additional problems with optimizing such scanning-equipped NTC solutions to reflect the latest scanning techniques, which are constantly changing.

DISCLOSURE OF THE INVENTION

A system, method and computer program product are provided for scanning data received from a computer network. Included is a central processing unit for processing data. Coupled between the central processing unit and a network is a network processor. Such network processor is capable of scanning data received from the network based on an update. Such network processor is further capable of receiving the update via the network.

In one embodiment, the update may include a plurality of regular expressions. As an option, the update may be received automatically. Moreover, the network processor may be a component of a network interface circuit board coupled to the central processing unit.

Still yet, the scanning may include scanning the data for viruses, or any other desired type of security function. Optionally, the scanning may be executed utilizing drivers installed on the network processor. Such drivers may include negative drivers and/or positive drivers. In the case of the negative drivers, such drivers may include rules for conditionally scanning data based on a type thereof.

DESCRIPTION OF THE PREFERRED EMBODIMENTS

Figure 1:
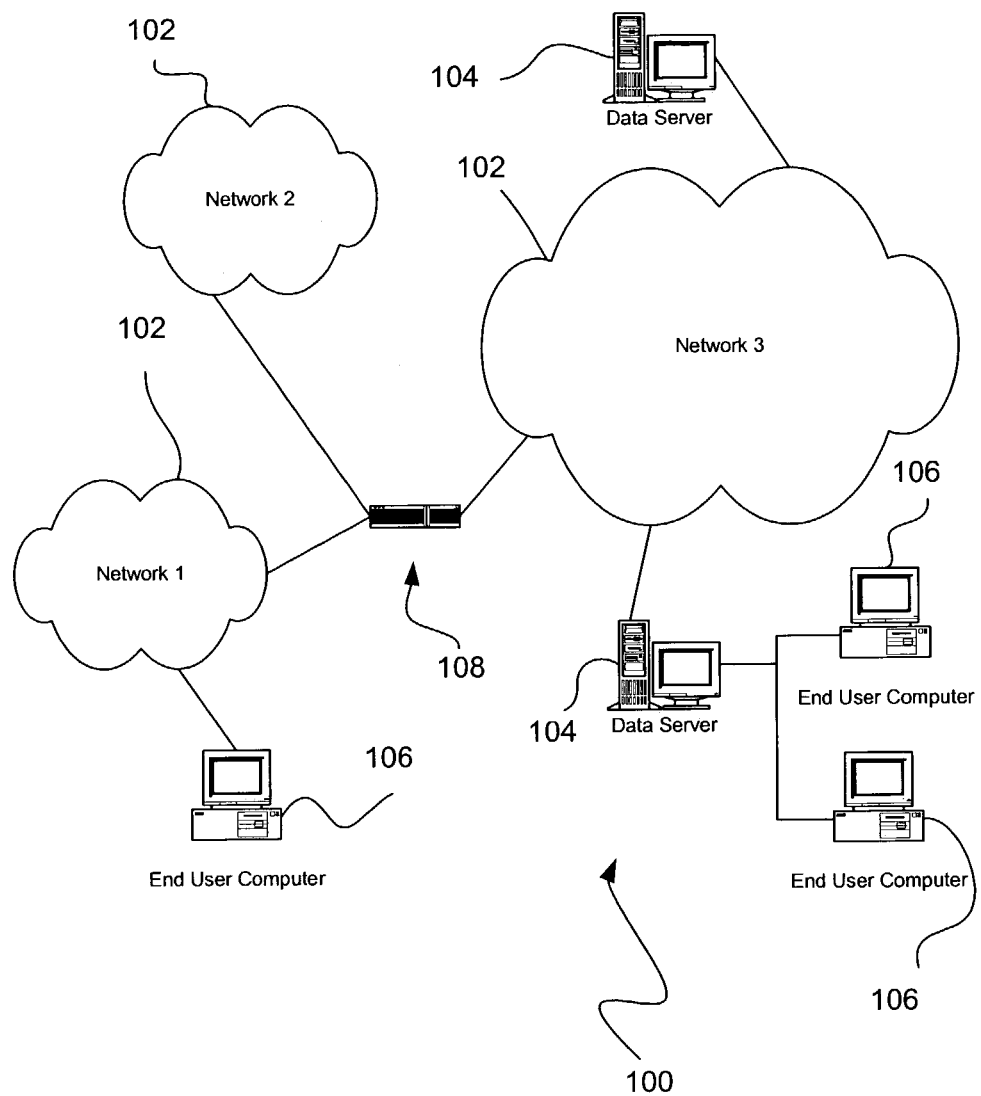
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wide area network (WAN) such as the Internet, etc.

Coupled to the networks 102 are data server computers 104 which are capable of communicating over the networks 102. Also coupled to the networks 102 and the data server computers 104 is a plurality of end user computers 106. Of course, various other devices (i.e. a router 108, etc.) may be included.

Figure 2:
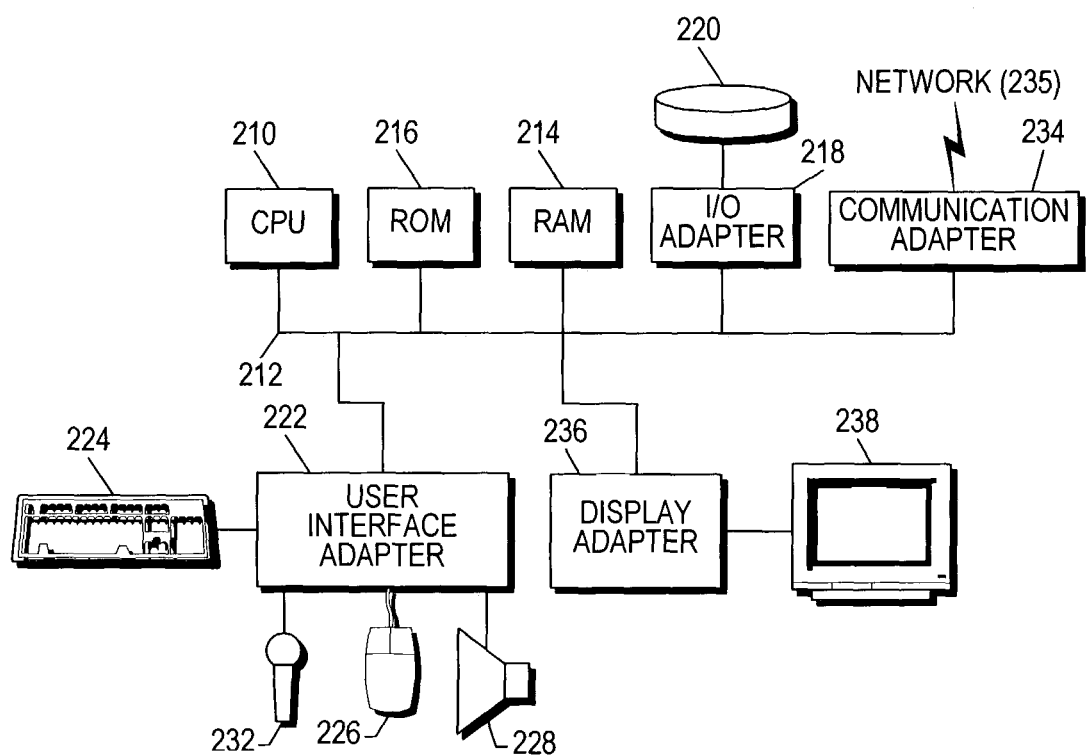
FIG. 2 shows a representative hardware environment that may be associated with the data server computers and/or end user computers of FIG. 1, in accordance with one embodiment.

FIG. 2 shows a representative hardware environment that may be associated with the data server computers 104 and/or end user computers 106 of FIG. 1, in accordance with one embodiment. Such figure illustrates a typical hardware configuration of a workstation in accordance with a preferred embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, adapter 234 for connecting the workstation to a communication network 235 (e.g., a data processing network such as that of FIG. 1, for example) and a display adapter 236 for connecting the bus 212 to a display device 238.

The workstation may have resident thereon an operating system such as the Microsoft Windows NT or Windows/95 Operating System (OS), the IBM OS/2 operating system, the MAC OS, Linux or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing any network configuration, and the foregoing platform should not be construed as limiting in any manner.

Figure 2A:
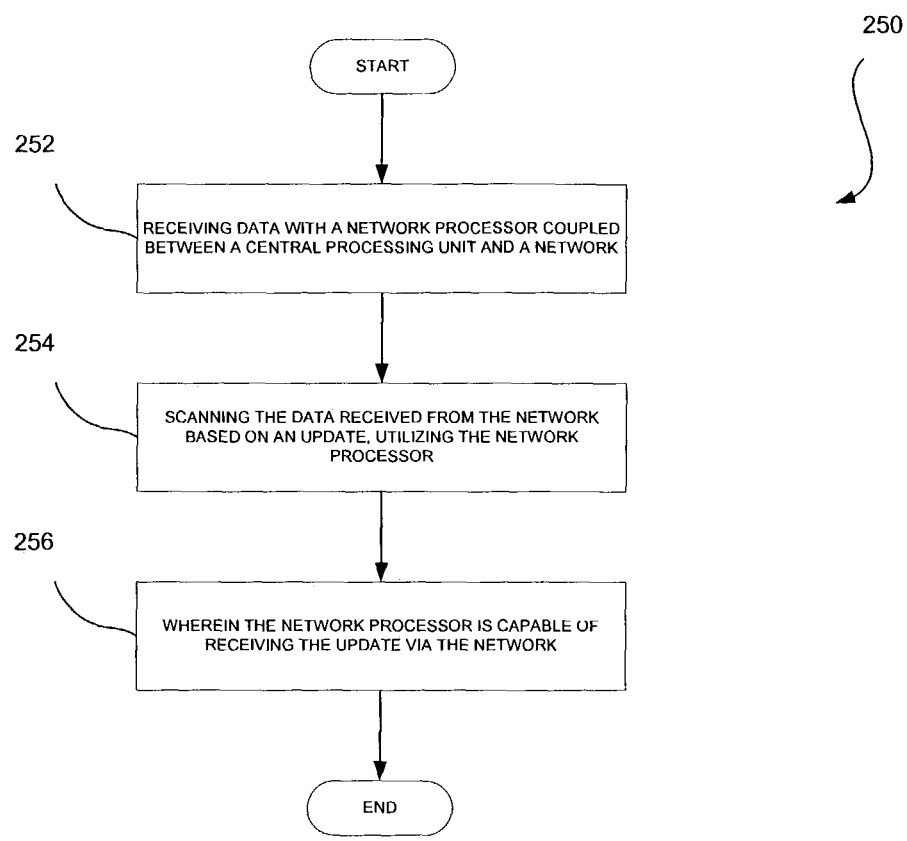
FIG. 2A illustrates one exemplary method for scanning data received from a computer network utilizing a network processor, in accordance with one embodiment.

FIG. 2A illustrates one exemplary method 250 for scanning data received from a computer network utilizing a network processor, in accordance with one embodiment. As an option, the present method 250 may be implemented in the context of the architecture of FIGS. 1-2. Of course, the present method 250 may be implemented in any desired context.

In operation 252, data is received with a network processor coupled between a central processing unit and a network. Such data may include any desired information, application, etc. that may be communicated via the various protocols supported by the network. Just by way of example, the data may include a web-page communicated via hypertext transfer protocol (HTTP). As mentioned earlier, such data may include HTTP "get" verbs that may be employed to reference a vast array of various pictures (i.e. gifs, tiffs, etc.) associated with the web-page.

In the context of the present description, a network processor may refer to any hardware separate from the central processing unit capable of performing network analysis and/or security functions on the data.

In operation 254, the data received from the network is scanned utilizing the network processor. Such scanning may include any algorithm capable of detecting viruses, worms, Trojans and/or any other type of malicious code; and/or further include any other desired type of security function. By utilizing the network processor in such a manner, various tasks may be offloaded from a network analysis and/or security program running on the central processing unit.

In one embodiment, an update may dictate the manner in which the network processor performs the scanning. Moreover, the update may be received automatically. See operation 256. Moreover, the network processor may be a component of a network interface circuit board coupled to the central processing unit.

To accomplish this, the scanning may optionally be executed utilizing drivers installed on the network processor. Such drivers may include negative drivers and/or positive drivers. As an option, such drivers may include additional functions to further enhance the scanning process. Still yet, regular expressions may be used to control the scanning. Such regular expressions may facilitate an update process by which the scanning is optimized from time to time, by simply updating such regular expressions.

In the context of the present description, a regular expression (sometimes abbreviated as "regex") may optionally involve a way for a computer user or programmer to express how a computer program should look for a specified pattern in data and then what the program is to do when each pattern match is found. One exemplary tool for specifying and handling the incidence of regular expressions is grep, a utility found in UNIX-based operating systems and also offered as a separate utility program for MS WINDOWS and other operating systems.

When negative drivers are used in conjunction with the network processor, rules may be included for conditionally scanning data based on a type thereof. For example, various types of files which have a low-risk for proliferating viruses may be dropped or skipped during the scanning, thus accelerating the scanning process.

It should be noted that any amount of the various scanning may be offloaded from the central processing unit and the associated network analysis and/or security software executed thereon. For example, only a portion of the scanning and/or related processes may be offloaded to the network processor. On the other hand, an entirety of the scanning and/or related processes may be offloaded.

In the context of the aforementioned web-pages, the scanning may, for example, identify HTTP "get" verbs to, in turn, identify various referenced pictures (i.e. gifs, tiffs, etc.) or any other low-risk files. To this end, scanning of the pictures may be avoided to accelerate the scanning process. In the situation where the central processing unit performs some or all of the scanning, the network processor may either notify the central processor that scanning of the pictures/low-risk files may be avoided or simply cull the files so that the central processor-implemented scanner never receives the same.

Since the various rules and/or data used by the network processor to scan may change from time-to-time, the network processor may be updated, as mentioned earlier. Such updating may be manual, automatic, periodic, and/or carried out in any desired manner.

In one embodiment, the update may include a plurality of the aforementioned regular expressions, making the update process as simple as broadcasting any new regular expressions.

One exemplary environment in which the present method 250 may be implemented will now be set forth in greater detail. It should be strictly noted that the following embodiments are set forth for illustrative purposes only and should not be considered limiting in any manner. For example, it is conceivable that the present method 250 may be carried out in the context of any desired platform.

Figure 3:
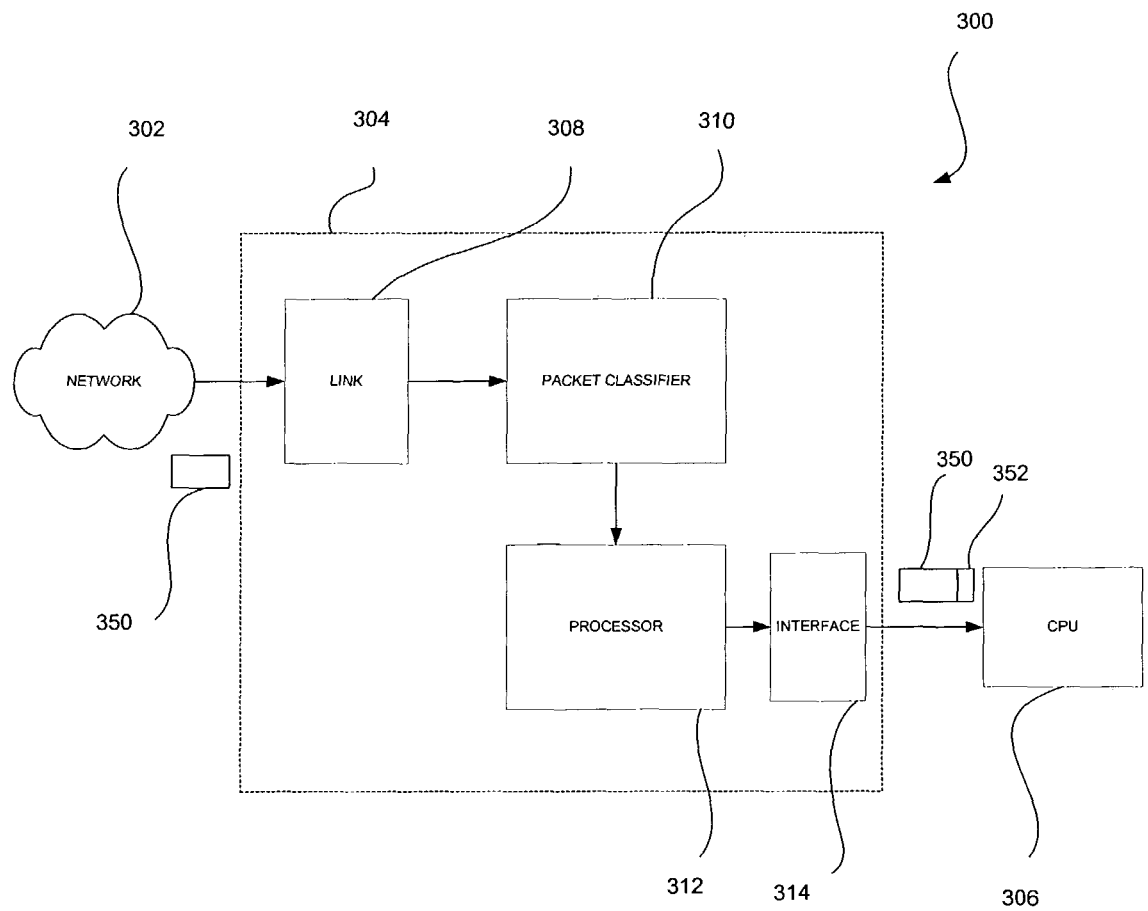
FIG. 3 illustrates an adapter, in accordance with one embodiment.

FIG. 3 illustrates an adapter 300, in accordance with one embodiment. As an option, the present adapter 300 may be implemented in the context of the network interface circuit board (NIC) adapter 234 of the computer of FIG. 2 and the network of FIG. 1. Of course, the adapter 300 may be implemented in any desired context, and include any adapter interfacing a processor with a network.

As shown, the adapter 300 receives packets from a network 302 and communicates with a central processing unit 306 (CPU—or any host processor for that matter). Moreover, the adapter 300 includes a link interface 308 for receiving packets from the network 302, a packet classifier 310 for classifying the packets, and a network processor 312 for processing the classified packets. Such classified, processed packets are then communicated to the CPU 306 via an interface 314.

In one embodiment, the CPU 306 and/or an associated host computer incorporates network analyzer and/or security software, hardware, logic, etc. for performing network analysis and/or security operations. One example of such products may include the MCAFEE® and SNIFFER® products manufactured by NETWORK ASSOCIATES, INC®. Of course, however, any type of product may be utilized.

In use, various network analysis and/or security operations traditionally performed by the CPU-implemented software may be offloaded to the network processor 312 and/or various other components of the adapter 300. Moreover, the classification performed by the adapter 300 may further facilitate the various network analyzer/security operations performed by the CPU 306 and/or network processor 312. Still yet, the adapter 300 may format the classified and/or processed packet data into a format that facilitates the transfer thereof to external memory (i.e. memory associated with the CPU 306 or related host computer).

In one exemplary embodiment, such classifying and/or formatting may entail "tagging" the packets by appending or incorporating data therewith. As will soon become apparent, such data may include tags, digests or any other desired data. As shown in FIG. 3, packets 350 are received and processed by the adapter 300, thus rendering packets 350 with data 352 appended thereto. Such data 352 may thus be used by the CPU-implemented software and/or the network processor 312 to more effectively analyze and secure a network, in various ways that will be set forth hereinafter in greater detail.

Figure 4:
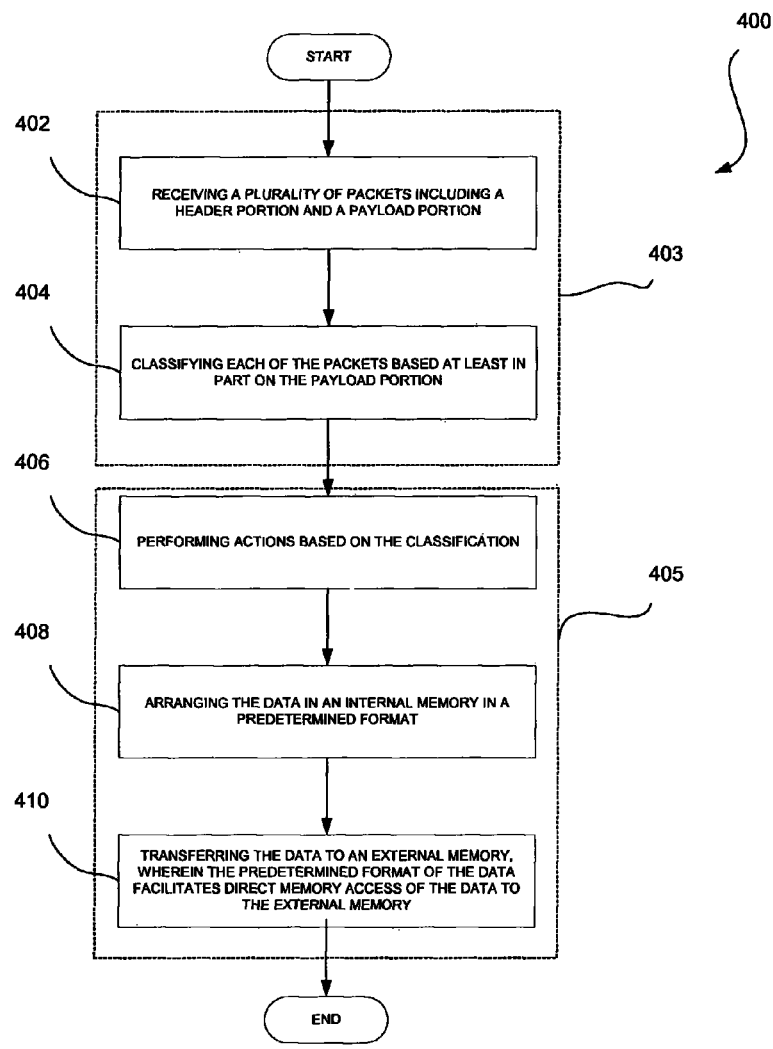
FIG. 4 illustrates one exemplary method that may be implemented in an adapter, in accordance with one embodiment.

FIG. 4 illustrates one exemplary method 400 that may be implemented in an adapter, in accordance with one embodiment. As an option, the present method 400 may be implemented in the context of the adapter 300 of FIG. 3. Of course, the present method 400 may be implemented in any desired context.

As an option, the present method 400 may include a first set of operations 403 that may be implemented utilizing a packet classifier (see, for example, the packet classifier 310 of FIG. 3). Moreover, the present method 400 may include a second set of operations 405 that may be implemented utilizing a network processor (see, for example, the network processor 312 of FIG. 3). Of course, any of the various operations of the present method 400 may be implemented in the context of any adapter component.

Initially, a plurality of packets may be received. Note operation 402. Such packets may include a header portion and a payload portion, as is conventional in the art. Next, in operation 404, each of the packets may be classified based at least in part on the payload portion.

In one embodiment, the classifying of operation 404 may include tagging each of the packets based at least in part on the payload portion thereof. Such tagging may be programmable, and include appending data to each packet. The content of the tags may include any data which results from the classification process, and that may be useful in subsequent network analysis computing. Just by way of example, the data appended to the packets may include time stamps, addresses, protocol-related information, etc. that is identified during the classification process.

Next, in operation 406, various actions are performed based on the classification. In one embodiment, the actions may include security actions, network analysis actions, etc. Still yet, the actions may include filtering, triggering alarms, etc. For example, the packets may be filtered based on the data appended thereto by the classification process, alarms may be triggered based on such data, etc. Still yet, the actions may be accelerated as a result of the classification, since certain processing may be avoided by simple inspection of the tags. Again, such actions may be programmed by a user such that certain user-configured actions occur when certain user-configured data is present in the associated tag.

Next, in operation 408, data is arranged in an internal memory in a predetermined format. Similar to the classification process, such format may involve various tagging or any other desired formatting. Such predetermined format of the data facilitates direct memory access (DMA) of the data to an external memory, and the use thereof by a CPU-implemented software program. See operation 410. More information regarding exemplary tagging and formatting details will be set forth during reference to an optional, illustrative embodiment to be described hereinafter.

It should be noted that the various foregoing operations may be carried out in any desired order. Just by way of example, the actions of operation 406 may be performed after operation 408 by a CPU-implemented software program.

Figure 5:
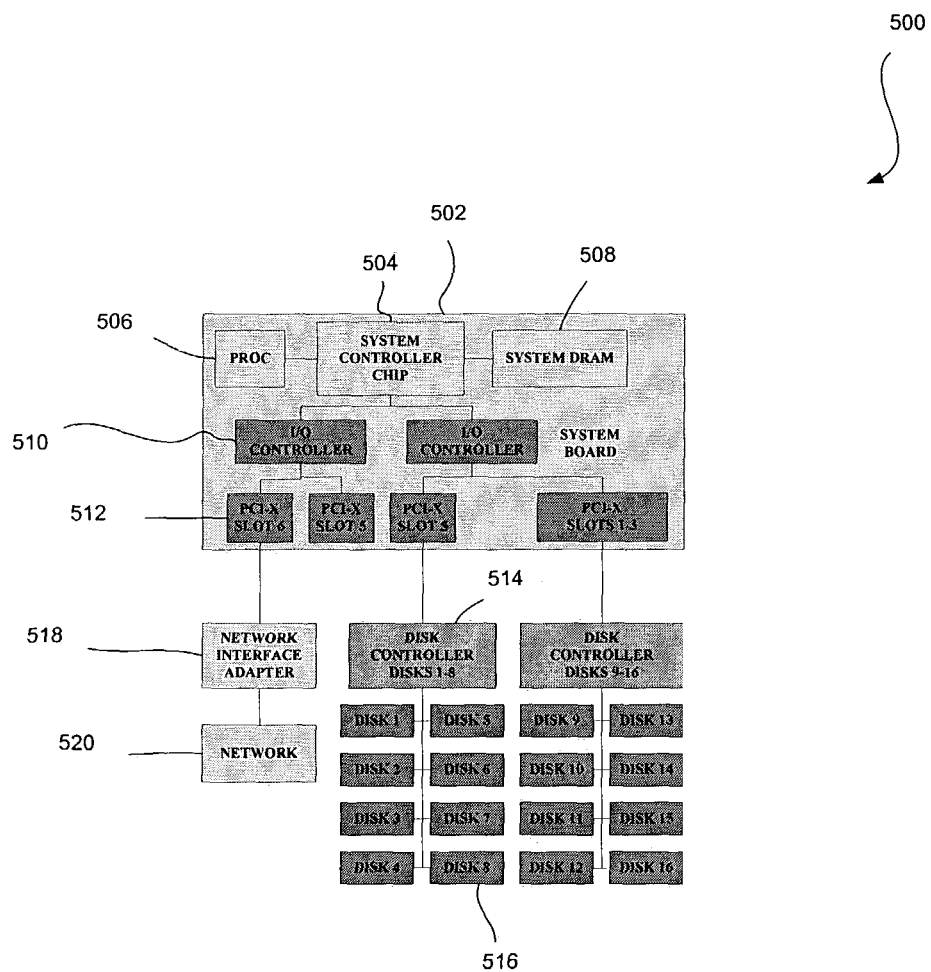
FIG. 5 illustrates one exemplary system with which an adapter may operate, in accordance with one embodiment.

FIG. 5 illustrates one exemplary system 500 with which an adapter may operate, in accordance with one embodiment. As an option, the present system 500 may employ the various features of the forgoing framework set forth in FIGS. 1-4. Of course, the present system 500 may be implemented in any desired context.

As shown, a motherboard 502 is provided with a system controller integrated circuit 504 coupled to a processor 506 and memory 508. Further provided is a plurality of I/O controllers 510, which are, in turn, coupled to a plurality of PCI slots 512.

Coupled to the motherboard 502 via the PCI slots 512 is a plurality of disk controllers 514. The disk controllers 514 are, in turn, coupled to a plurality of disks 516. Also coupled to the PCI slots 512 is an adapter 518 which interfaces a network 520. In one embodiment, adapter 518 may be configured in the manner set forth in FIG. 3 and operate in the manner set forth in FIG. 4. As will soon become apparent, however, the adapter 518 may be configured in any desired manner.

For example, in use, the adapter 518 performs physical media-dependent operations and interface to network connections. Moreover, the adapter 518 interfaces with various networking connections including Gigabit Ethernet. It may collect Gigabit Ethernet related data, perform application specific processing and provide an interface to a host computer to gain access to such information.

Figure 6:
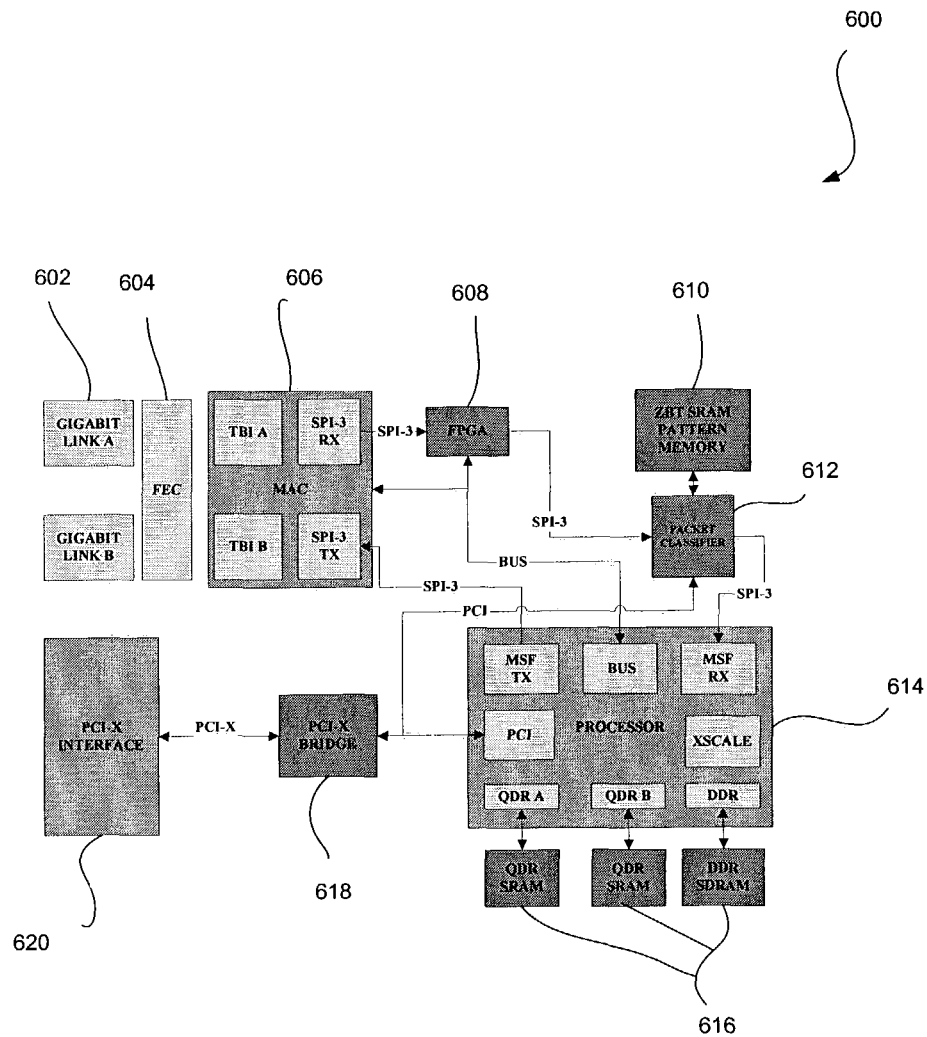
FIG. 6 illustrates one exemplary adapter, in accordance with one embodiment.

FIG. 6 illustrates one exemplary adapter 600, in accordance with one embodiment. As an option, the present adapter 600 may employ the various features of the forgoing framework set forth in FIGS. 1-4, and be implemented in the context of the system 500 of FIG. 5. Of course, however, the present adapter 600 may be implemented in any desired context.

As shown, the adapter 600 includes a plurality of Gigabit links 602 for receiving packets of network traffic from a network. Such Gigabit links 602 are, in turn, coupled to a framing component 604 which interfaces a media access control (MAC) module 606 with various TBI components and a receiver/transmitter for handling conventional addressing operations. Further provided is a field programmable gate array (FPGA) 608 that time stamps incoming packets.

Still yet, a packet classifier 612 is coupled to the FPGA 608 and combined with memory 610 for classifying the incoming packets by tagging the same. In one embodiment, the packet classifier 612 may take the form of an IDT (a.k.a. SOLIDUM) Packet Classification Engine ("PAX.port 2500"). Of course, however, the packet classifier 612 may take any form. More information regarding such classification process and the packet classifier 612 itself will be set forth hereinafter in greater detail.

Coupled to the packet classifier 612 is a network processor 614 adapted to carry out various network processing with the classified packets. To accomplish this, the network processor 614 includes a transmitter/receiver, bus, and a bank of memory 616. In one embodiment, the network processor 614 may take the form of an INTEL IXP2400 processor. Of course, however, any desired network processor 614 may be used. Just by way of example, network processors 614 manufactured by MOTOROLA, IBM, BROADCOM, etc. may be employed.

Once processed, the packets and data associated therewith may be directed to an associated computer via a peripheral component interconnect (PCI) bridge 618 and interface 620.

In use, the packet classifier 612 may be combined with streaming interfaces. It may be optimized for full Layer 7 content inspection and regular expression matching. The packet classifier 612 may further be combined with programmable state machine technology that can be programmed to closely inspect packets for vital information at wire speed, up to and including Layer 7. Thus, the packet classifier 612 may be used to offload various classification and filtering functions from the network processor 614. Since it may be optimized to perform a single function of classification, it can examine deeper into packets and handle more complex classification at wire speed.

The packet classifier 612 may be further designed to perform two functions of classification: packet parsing and table lookup. Parsing is the process of examining a packet and identifying the pre-defined fields of interest. The parsed packet fields are compared to pre-determined criteria in a lookup table and classified based on the results of that lookup.

One optional feature of the packet classifier 612 is its ability to perform pattern matching for unanchored fields. This allows string and binary signature matches to occur, and may be very useful in searching for virus text, cookies, etc. The packet classifier 612 may further utilize regular expressions for matching strings. This feature may be used for arbitrary string search at arbitrary offset from the beginning of the frame at line rate. Some exemplary regular expressions are forth in Table 1.

TABLE 1

"^GET .*?\.htm.*?\nHost: www\.location\.com$";
"POST .*?\nHost: www\.loc2\.com";
".*?\n.*?www.loc[a-zA-Z0-9]*?\.com";
"GET [^\r\n\t ]+?\.(html|xml)"; )

Since regular expressions may be used to search for floating strings, they can be used to filter uniform resource locator (URL) or Internet virus strings. Therefore, the present embodiment may be used as part of a firewall, intrusion detection, virus scanning and/or anti-spam devices.

The programmability of the packet classifier 612 allows one to define any set of protocols and data patterns using an appropriate pattern description language and protocol library. Various policies may be loaded into the external pattern memory 610 with the help of the network processor 614 or a host computer.

In one embodiment, classification may entail a process by which packets are identified and digested into a tag and digest. The tag may indicate what protocols the packet contains, and if it passes the filters set by the user. It may also indicate what kind of information the digest field contains. In addition, the packet classification engine may provide a message digest. The message digest may contain extracted packet fields or offsets to particular fields of interest in the packet. The downstream network processor 614 may perform any analysis of the packet by just identifying the tag and digest fields without performing deep packet analysis. These tags and digests (or any other appended data) may be referred to as tagging "results," in the context of the present description.

Figure 7:
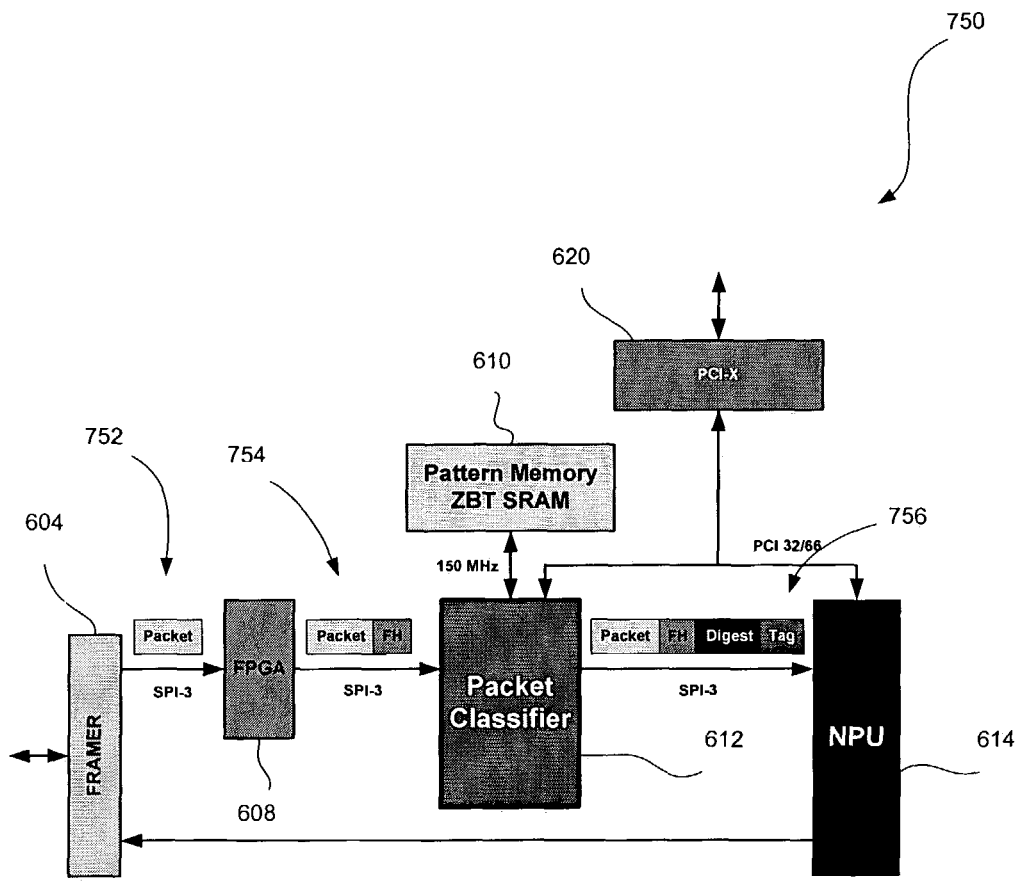
FIG. 7 illustrates the manner in which tags and digests are appended to packets received by the adapter of FIG. 6, in accordance with one embodiment.

FIG. 7 illustrates the manner 750 in which the tags and digests are appended to the packets, in accordance with one embodiment. As shown, the framing component 604 sends the packets to the FPGA 608 in operation 752. In operation 754, the FPGA 608 prepends an 8-byte (or any other sized) header ("FH") to the packet that contains timestamp information. Then, the packet classifier 612 may classify the packet. The results of the packet classifier 612 may then be prepended to the packet and the FPGA header, as indicated in operation 756. The results may, in one embodiment, contain a 64-bit (or any other sized) tag and variable length digest that has extracted portions of the packet.

Packet classification may be used for various purposes. The results of the packet classifier 612 may be used to detect RMON1/RMON2 layer and higher protocol types. In addition, the packet classifier 612 results may also be used to implement multiple capture filtering/triggering detection and dynamic protocol processing. Given that RMON1/RMON2 requires protocol type detection, software is typically written to parse packet data to determine the layer 2 and layer 3 protocols. The tagging provided by the packet classifier 612 may indicate both the layer 2 and layer 3 protocols along with possibly higher layer protocols. This relieves a host computer from having to perform other tasks such as deep inspection of interesting packet types, stateful classification of packets, streaming of data to host, accumulating statistics, etc.

The result of the packet classifier 612 can also provide bit-wise flags indicating a match of particular classification rules. Rules can be dynamically added and removed from the pattern memory 610 of the packet classifier 612. This allows user filters (i.e. MAC address pairs, IP address pairs, user patterns and un-anchored string and binary pattern searches) to be dynamically added to configure a capture filter or trigger event. When the classification sees packets that match these rules, it can set/clear specific bits in the tag field. Downstream processing by the network processor 614 can make decisions based on selected filter/trigger bits rather than doing host processor-intensive parse and compare operations.

The results of the packet classifier 612 may also provide bits indicating that certain control packets exist on the link. These control packets may contain information about the setup or tear down of another payload protocol. For example, voice over IP (VOIP) uses well-known ports for the H.323 protocol message setup. However, the payload of voice circuits may use dynamically created ports for the carrying of voice traffic. This voice traffic cannot be classified without knowledge of the message setup traffic. The packet classifier 612 can set particular bits indicating to the network processor 614 that it needs to know about a particular UDP/TCP port pair that may be used for the voice traffic. Therefore, a new rule may be dynamically added to the packet classifier 612. When the H.323 message tear down is received, the network processor 614 may also be notified via a result bit and thus the dynamically created rule for that voice traffic may be removed. Using a traditional host processor for this kind of stateful packet inspection can be unreliable unless it can be performed at wire speed. With the packet classifier 612, this kind of processing can occur at wire speed for all packets on the link.

As mentioned hereinabove, the packet classifier 612 may be a programmable device. Such programming can be accomplished in two operations. First, PDL text files may be compiled into libraries, and then run-time programming may be carried out via a control plane processor of the network processor 614.

PDL text files may take the form of C-like data structures that define a protocol, such as how it is encapsulated and how it should be processed. A sample PDL pattern is set forth in Table 1A.

TABLE 1A

```
PATTERN IP_4_Hdr (SrcAddr BIT 32, DstAddr BIT 32, ToS UINT 8) {
    Version             UINT 4 == 4;
    IHL                 UINT 4 >= 5;
    TypeOfService       UINT 8 == ToS;
    TotalLength         UINT 16;
    Identification      UINT 16;
    FlagReserved        BIT 1 == 0;
    FlagsFragment       BIT 2;
    FragmentOffset      UINT 13;
    TimeToLive          UINT 8;
    Protocol            BIT 8;
    HeaderChecksum      BIT 16;
    SourceAddress       BIT 32 == SrcAddr ;
    DestinationAddress  BIT 32 == DstAddr ;
    OptionsAndPadding   ANYOF   IHL == 5 : IP_4_16_Options_0;
                                IHL == 6 : IP_4_16_Options_32;
                                ...
                                IHL == 15 : IP_4_16_Options_320 }
```

The patterns may be declared using a "pattern" statement. A pattern can refer to the patterns defined earlier. This may allow easy development of complex patterns using simpler pattern definitions. Patterns can also have parameters. Then, the API functions pass the required parameters when an instance of a particular pattern is created in order to determine if a match occurs with a packet. For example, the IP address filter pattern can be created by using the source and destination IP addresses. Then, for each pair of IP address, the user enters a new instance of this pattern. The parameters can contain specific bits or "don't care" bits at certain bit positions. This may make it possible to develop IP address filters for addresses belonging to a subnet. All of these PDL statements can be combined to form rules that can be used to classify packets according to the encapsulated protocols or to create rules based on user filters. Like C software modules, the PDL text files may be compiled into binary library modules of protocol classification rules.

At run-time, the network processor 614 may contain a library used by an application program. Such application program sets up protocol classification rules for known protocols using the compiled rules available in the library. Moreover, the application program module may load the rules into the packet classifier 612 at start up time. During operation, the user configured filter settings may be converted into the runtime filtering rules by the application program and any desired API functions. The dynamic rules may be downloaded into the memory 610 of the packet classifier 612 dynamically during normal operation. When the user changes the filter configurations, the rule modifications may be reflected dynamically by adding new filter rules to the memory 610 of the packet classifier 612 and removing the deleted filter rules from such memory 610. Other rules such as regular expression searches for un-anchored string searches like NIMDA filters can also be added and removed dynamically per user request.

As mentioned earlier, the packet classifier 612 produces programmer-defined classification tags, and programmer-defined packet digests. The tags and the digests may be communicated to the network processor 614 in-band with the packet data. They can directly drive application logic or signal a host or network processor 614, significantly reducing the data path workload. The tags and digests are programmer defined and their meaning can be controlled completely by the programmer.

Table 2 summarizes one exemplary configuration of tag properties.

TABLE 2

The programmable 64-bit classification tag pre-pended in-band
The meaning of tag is completely programmable
The tag size is programmable in 1-byte increments Table 3 summarizes one exemplary configuration of digest properties.

TABLE 3

192 bit fields are pre-pended in-band
The digest can be programmed to contain copies of bit fields in the packet
Digest can also be programmed to contain pointers (offsets) to fields of interest into the packet The tag and digest can optionally overwrite part of the packet to minimize the downstream bandwidth. It may be necessary to implement this strategy if the result bytes pre-pended to the packet adds considerable amount of overhead to the bandwidth.

Since the classification tag and digest are pre-pended to the packet, the available downstream bandwidth between the packet classifier 612 and the network processor 614 is reduced by the tag and digest bytes. For small Ethernet packets, the added overhead by the tag and the digest can be considerable. During hardware design, it may be necessary to note the clock speed impact caused by the increased overhead introduced by the packet classifier 612 and the FPGA 608.

In use, the tag and digest fields may be used to build up keys to access statistics and metric tables. Depending on the application with which they are used, a packet header may be generated from the contents of the tag and digest fields. An optional format and type of the data of the tag and digest will be set forth hereinafter in greater detail.

One example of operation of the packet classifier 612 will now be set forth. In one embodiment, the packet classifier 612 may be combined with multiple classification-engine cores divided into separate groups each having a certain number of engines. Each group may have a separate pattern memory interface. Therefore, the same pattern memory may be downloaded into separate physical SRAM interfaces each serving a different group of classification engines. This parallel processing configuration may make it possible to classify packets at optimal rates. There may also be a scheduler for each group. The scheduler uses the next engine that is not busy to process the next incoming frame. Once an engine starts processing a frame, it may continue until it completes the classification of that frame. Depending on the design, there may be a limited amount of input buffer space in the packet classifier 612. The active channels may share the input buffer equally. Moreover, the packet classifier 612 may output packets in first-in first-out (FIFO) order so that packet order is maintained through the packet classifier 612.

During the programming of the packet classifier 612, the programmer may select a number of channels. The channels act as a logical path from the input to the output. Each channel acts independently from other channels. The number of possible channels, in one embodiment, may be 1, 4, 16, etc.

The pattern memory 610 of the packet classifier 612 can be programmed while the packet classifier 612 is in operation. This may allow the application to impose new classification and filtering rules while removing the unwanted ones. The pattern memory update process may use the same interface that the engines use to perform classification. Therefore, the write process may affect the rate of the classification pattern memory access. However, the available bandwidth for write access through the pattern memory interface can be programmable between any desired range of the total bandwidth.

If a packet does not match any of the programmed patterns in the pattern memory 610, a reject tag may be prepended to the packet. The content of the reject tag may be stored in a register that is programmable. If the packet classifier 612 fails to classify the packet due to an error, a host programmable error tag may be prepended to the packet. The value of the error tag is copied from a register whose contents are programmable by the developers.

In order to employ the full bandwidth of the classification engines, all pattern memory interfaces may be populated, and all of them may be loaded with the same pattern memory file.

More information regarding exemplary formats of the packets being communicated between the various components of the adapter 600 of FIG. 6 will now be set forth with reference to FIGS. 8-11.

Figure 8:
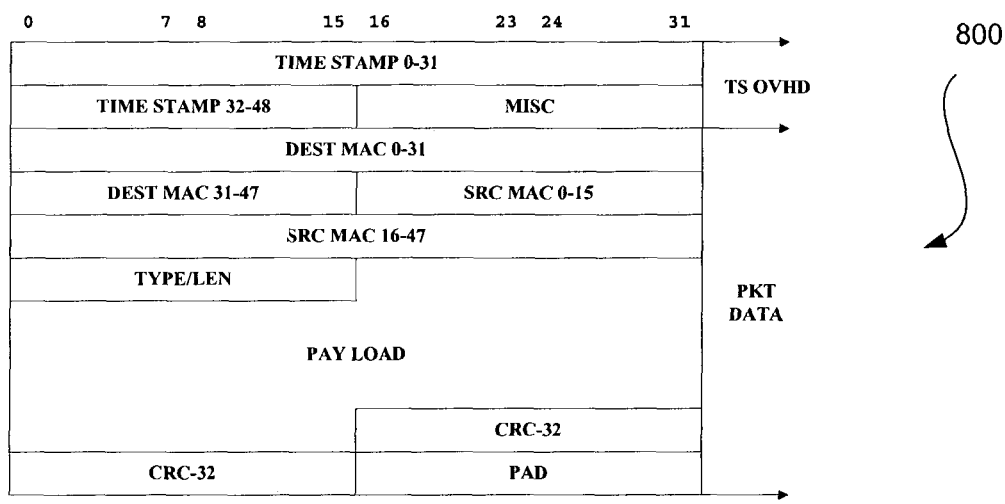
FIGS. 8-11 show more details regarding exemplary formats of the packets being communicated between the various components of the adapter of FIG. 6.

FIG. 8 illustrates one exemplary format 800 with which packets are communicated between the FPGA 608 and the packet classifier 612 of the adapter 600 of FIG. 6, in accordance with one embodiment. While the present exemplary format 800 is set forth in the context of the adapter 600 of FIG. 6, the present format 800 may be implemented in any desired context.

The present format 800 may be configured to send SPI-3 data in 16 byte bursts. This example indicates that the FPGA 608 may prepend 64 bits of information to the frame as it sends data to the packet classifier 612. This data may include a 48 bit timestamp which is 50 ns resolution. The MISC field may be defined by hardware.

Figure 9:
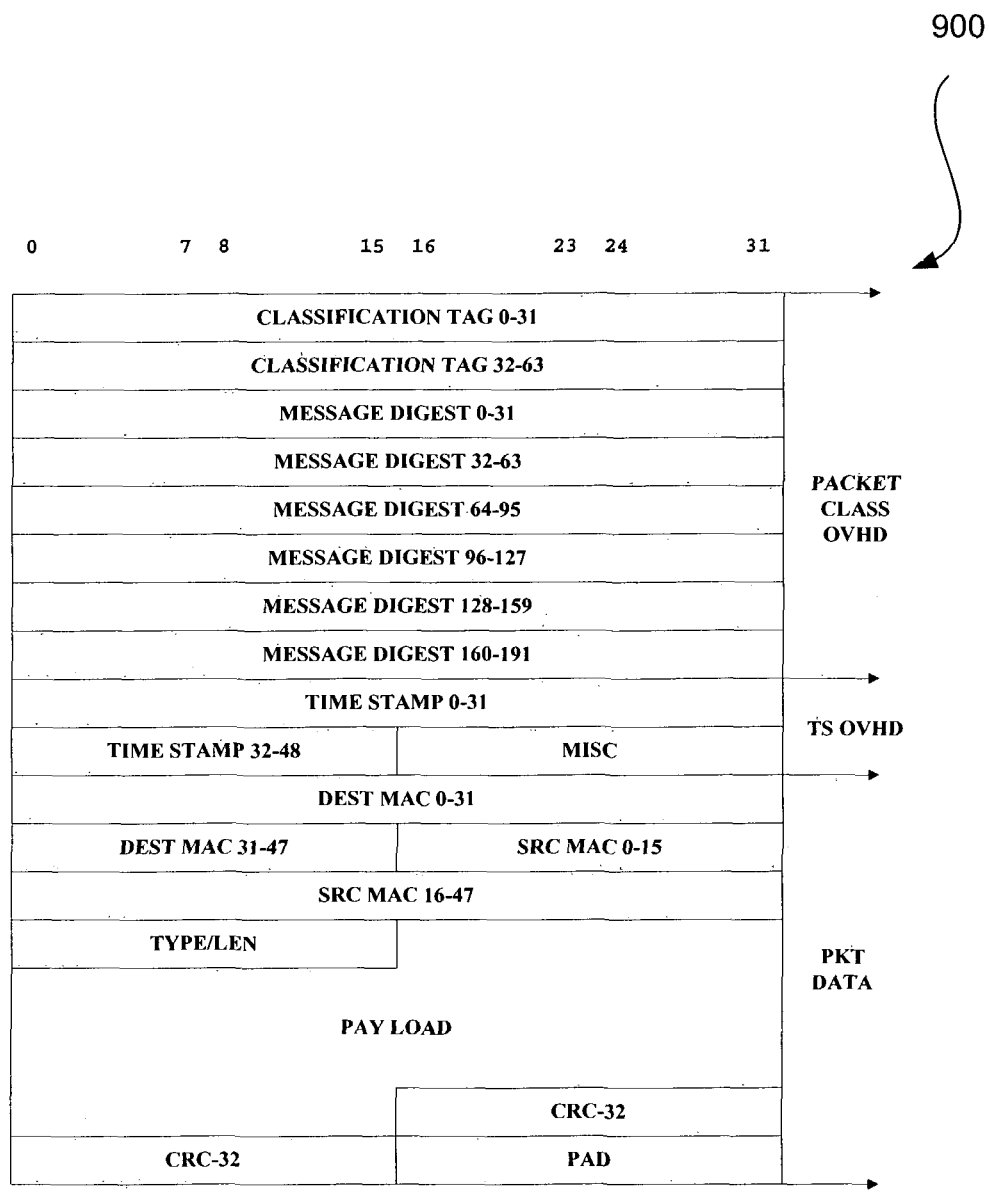

FIG. 9 illustrates one exemplary format 900 with which packets are communicated between the packet classifier 612 and the network processor 614 of the adapter 600 of FIG. 6, in accordance with one embodiment. While the present exemplary format 900 is set forth in the context of the adapter 600 of FIG. 6, the present format 900 may be implemented in any desired context.

Similar to previous formats, the present format 900 may be configured to send SPI-3 data in 64 byte bursts. The size of the receiver buffers of the network processor 614 may be configurable to 64, 128 or 256 bytes. The SPI-3 burst size and the receiver buffers size may be set to be equal to efficiently use the receiver buffer.

Figure 10:
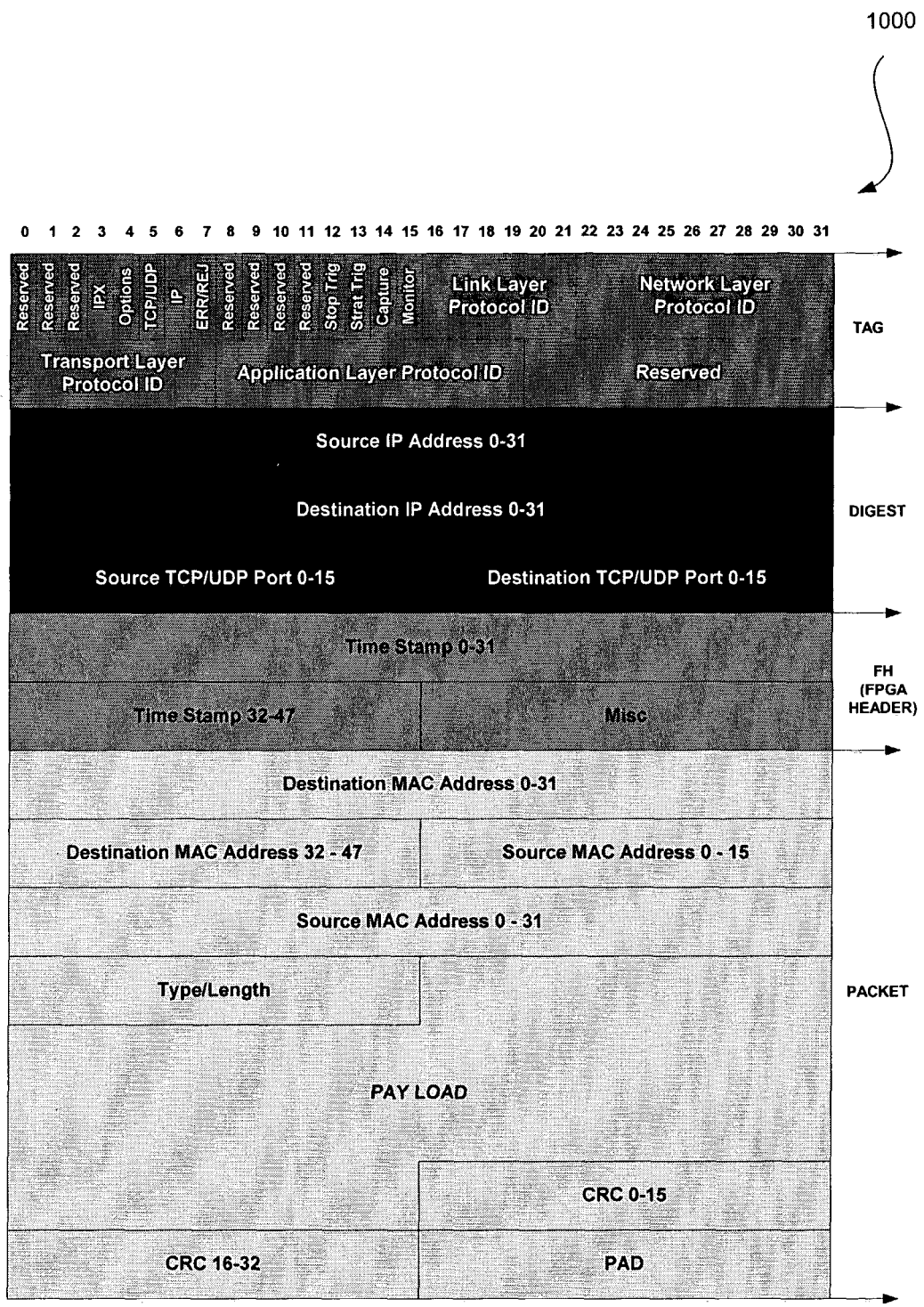

FIG. 10 illustrates another more specific exemplary format 1000 with which packets are communicated between the packet classifier 612 and the network processor 614 of the adapter 600 of FIG. 6, in accordance with one embodiment. While the present exemplary format 1000 is set forth in the context of the adapter 600 of FIG. 6, the present format 1000 may be implemented in any desired context.

As mentioned earlier, the present exemplary format 1000 may be used to facilitate processing by the network processor of the adapter by providing various information via the tags and digests. As shown in FIG. 10, the tag contains the results of the classification. The tag may include a 64-bit result prepended to the packets. Besides the tag field, the results contain a digest field that contains fields from the packet. The tag field may be divided into three major portions, as shown. The first portion of the tag field contains the controls bits, such as bits for notifying the network processor what digest fields are present. The control bits also may provide notification if the frame is rejected by the classification of the packet classifier due to an error or unexpectedly short frame.

The second portion of the tag is allocated for filtering control. The packets that pass the user configured filters may be marked with certain bits set in this portion of the tag. The third portion of the tag may be allocated for the protocol classification. At each layer, the developer defined identifier for each protocol may be written in the corresponding portion of the tag. Therefore, the downstream process may know which protocol headers are present in the frame. In order to allow future expandability, the remaining bits of the tag field may be reserved. One possible use of this reserved field is to put protocol-tunneling information. Tunneled protocols may include, for example, MPLS based tunneling, IPSec, VPN, etc.

If the packet is a TCP/IP packet, the digest may contain the source IP address, destination IP address, source port and destination port. These digest fields are present in the result if they exist in the packet. For example, an address resolution protocol (ARP) frame does not necessarily contain either IP addresses or TCP/UDP ports. Therefore, the digest field of an ARP frames is non-existent. An Internet control message protocol (ICMP) packet contains an IP header, but not either a TCP or UDP header. In this case, only the IP addresses may be in the digest field. The control portion of the tag field may let the downstream processes know what kind of digest information is prepended to the packet. This may make the downstream processes know the offset into the beginning of the packet data.

The tag and digest are added to the front of the FPGA header. The FPGA header is added by the FPGA and it contains a time stamp and miscellaneous information about packet, as explained earlier.

The "Err/Rej" bit is set to "1" if the packet classifier has rejected the packet, because it does not correspond to any of the rules listed, or the packet ended prematurely during classification. This bit is also set if there was an error during classification due to an unexpected end of frame. When this bit is set, the downstream network processor may need to process the contents using deep classification. Under normal operation, this bit may not be set very often.

The "IP" bit is set to "1" if the digest field contains valid IP addresses for IP headers. This may enable the downstream processes to interpret the contents of the digest field correctly. For example, the network processor needs to know what the digest field contains and how long the digest is so that it can determine the offset to the beginning of the packet.

The "TCP/UDP" bit field may be set to "1" if the packet contains either a TCP or UDP header with valid source and destination ports. This may enable the downstream processor to interpret the digest field correctly.

The "Options" bit may be set to "1" if either the IP or TCP or both have headers with options. For most of the network traffic, the options for IP and TCP headers are non-existent. This may allow downstream processes to know at which offset each protocol header starts once what protocol exists at each layer is known. However, once either IP or TCP has options, it may not be enough to know what protocol headers exist in order to know the offsets to protocol headers for higher layer protocols. However, the IP and TCP headers have no options for a very high percentage of the traffic. The downstream processes may use the fast path to determine the offsets from a lookup table if the "Options" bit is not set. When the packet corresponds to a small percentage of the traffic where these headers have IP or TCP options, the packet classifier 612 may set the "options". Then, the downstream processes may use a deeper analysis of the packet in order to determine the offsets to the beginning of each layer.

The "IPX" bit may be set to "1" if the digest contains a valid destination and source IPX addresses and socket number. The digest field for the IPX packets may be 192 bits (24 bytes) long. This is the total length of the network and node address fields in an IPX packet.

The next four bit fields correspond to "monitor", "capture", "start trigger" and "stop trigger" filters, respectively. The packet classifier 612 may also be programmed to perform filter rules to the packet at the line rate. In use, the packets that pass the user configured filters may have their appropriate bit set in the tag field. This may notify the downstream network processor 614 to take the appropriate actions. For example, if the monitor filter bit is set, but not the capture filter, then the network processor 614 may use such packet to update the monitoring statistics, but may not necessarily place the packet into a capture buffer. Due to configurations of the pattern memory 610 of the packet classifier 612, some of the filtering functionality may be implemented in the packet classifier 612, and the network processor 614 may implement the rest.

The rest of the tag field may be used for protocol classification exclusively. The protocol headers discovered at each layer may be written to the corresponding bit field for that layer. If an unknown protocol exists for a layer or there is no protocol discovered for that layer, the corresponding bit field may have all zeros. According to this convention, if there are all zeros in the bit field of a layer, the bit fields corresponding to the higher layers may also be zero. The size of the bit field allocated for protocol identification numbers for each layer may be chosen to guarantee there are enough bits to cover the known protocols currently, and to allow enough room for future protocols. Another reason for choosing the current widths of the protocol ID fields may be to make sure that a protocol ID is not broken into different integers when a 32-bit network processor loads the tag into the registers.

The "link layer protocol ID" field contains the developer defined identification numbers for each possible encapsulation for the Ethernet link layer protocols. The width of this field may, for example, be 6 bits. This may allow the developers to define 63 different link layer protocols.

The "network layer protocol ID" field contains the developer defined identification numbers for network layer protocol discovered in each packet. The width of this field may, for example, be chosen to be 10 bits.

The "transport layer protocol ID" field contains the developer defined protocol ID numbers for transport layer protocols. The width of this field may, for example, be chosen to be 8 bits, because the width of the protocol field in an IP header is also 8 bits.

The "application layer protocol ID" field contains the developer defined ID numbers for the application layer protocols. These ID numbers correspond to the port numbers of the UDP and TCP protocols. The same ID number may mean a different protocol when the transport layer protocol is TCP or UDP.

It should be again noted that the format of the tag and digest explained herein is set forth as an illustrative example, and should not be construed as limiting in any manner. One may change the format of the tag and digest during development, and later if one finds a better or different design.

Figure 11:
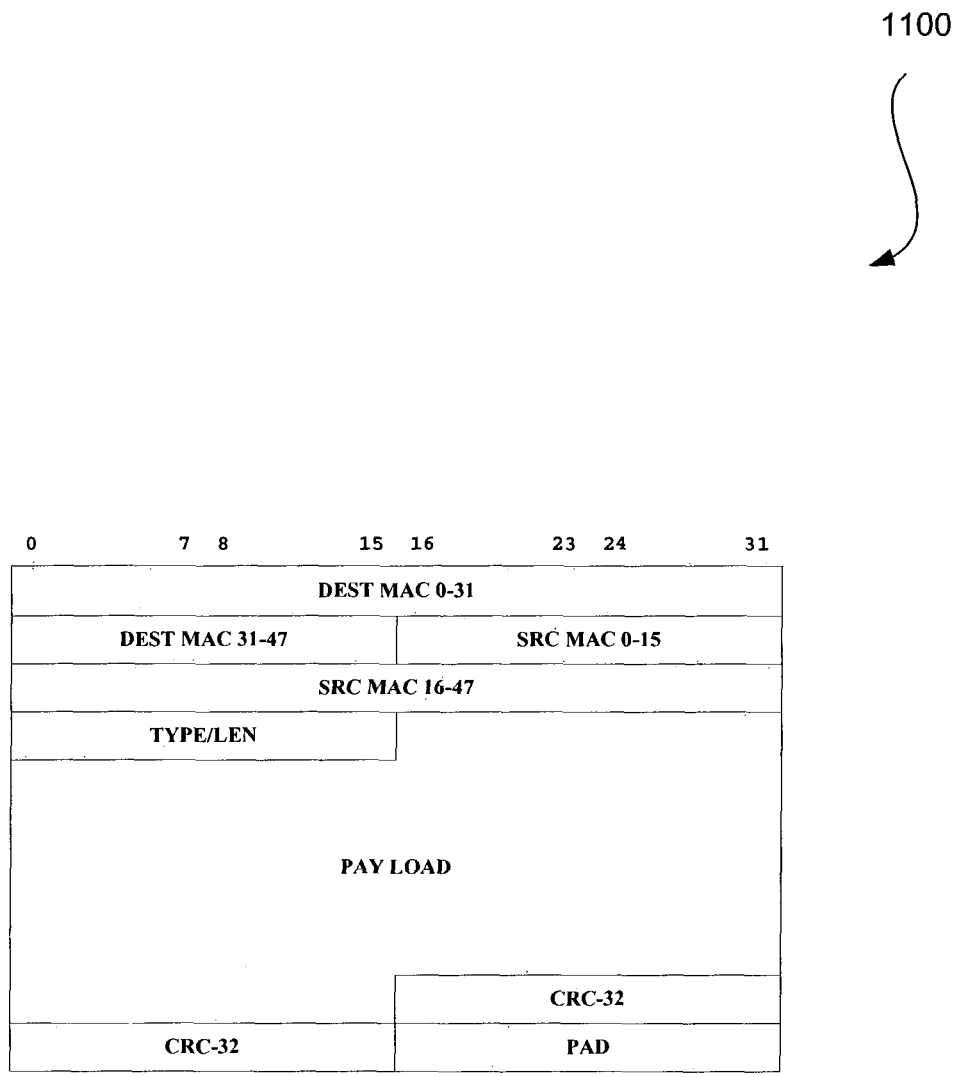

FIG. 11 illustrates one exemplary format 1100 with which packets are communicated between the network processor 614 and the MAC module 606 of the adapter 600 of FIG. 6, in accordance with one embodiment. While the present exemplary format 1100 is set forth in the context of the adapter 600 of FIG. 6, the present format 1100 may be implemented in any desired context.

Again, the present format 1100 may be configured to send SPI-3 data in 64 byte bursts. The size of the transmitter buffer of the network processor 614 may be configurable to 64, 128 or 256 byte. The SPI-3 burst size and the transmitter buffer size may be set to be equal to efficiently use the transmitter buffer.

It should be noted that the present exemplary format 1100 may be used by packets that are communicated between the MAC module 606 and the FPGA 608 of the adapter 600 of FIG. 6, in accordance with one embodiment.

In such embodiment, the present format 1100 may be configured to send SPI-3 data in 16 byte bursts to reduce the "link to SPI-3" latency that may be observed by the FPGA 608. This takes the generic form of an Ethernet Frame. The SPI-3 may use in-band channel assignment for each packet, channel 0 and channel 1. The present format example indicates some PAD and DWORD misalignment for the CRC-32 field. This is arbitrary and depends on the length of the payload field.

Figure 12:
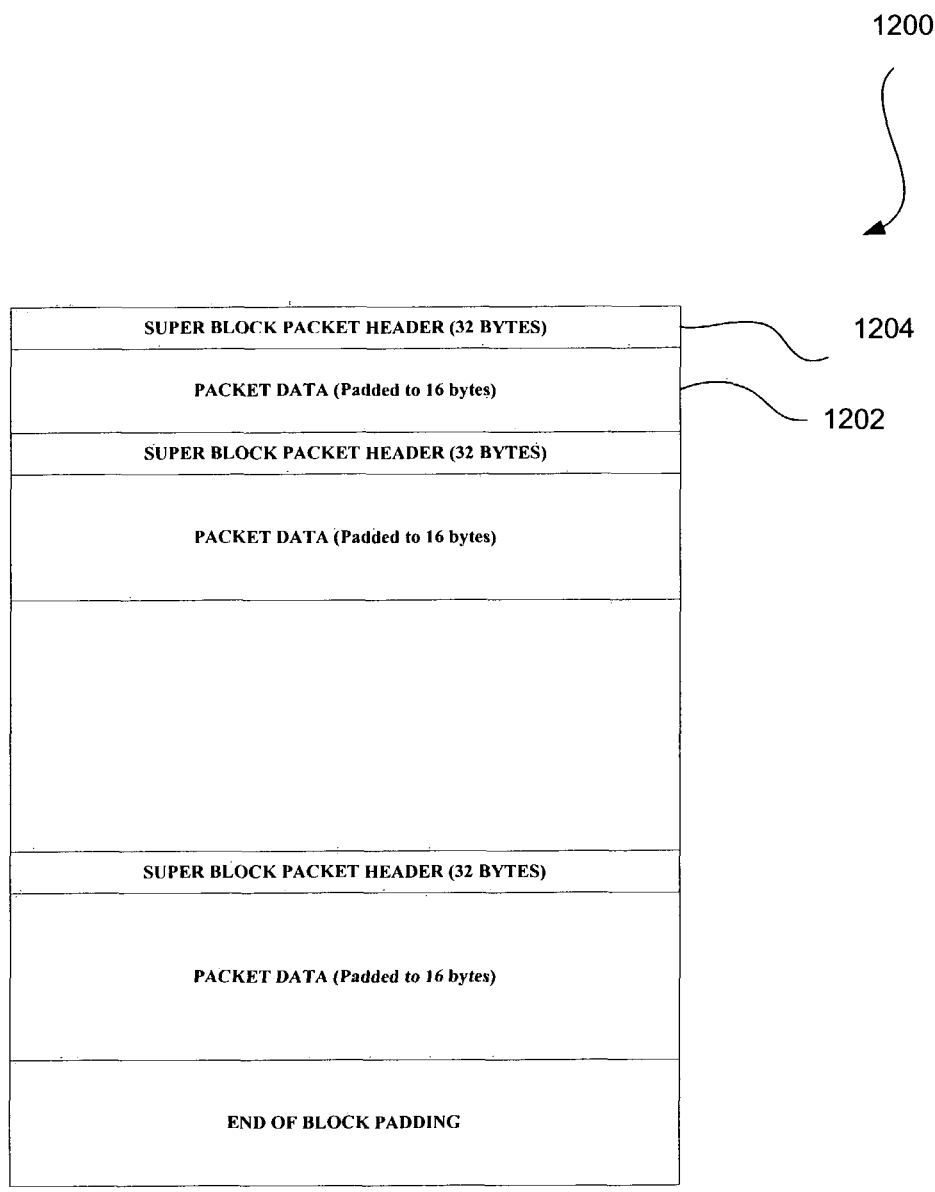
FIG. 12 illustrates one exemplary format with which packets are communicated between a network processor of an adapter and an external memory of a host computer mother board, in accordance with one embodiment.

FIG. 12 illustrates one exemplary format 1200 with which packets are communicated between the network processor 614 and the external memory 508 of the computer mother board 502, in accordance with one embodiment. While the present exemplary format 1200 is set forth in the context of the adapter 600 of FIG. 6 and computer mother board 502 of FIG. 5, the present format 1200 may be implemented in any desired context.

As mentioned earlier, such exemplary format 1200 may facilitate the transfer of the packets to the external memory. To accomplish this, a "super block" is provided including a plurality of packet data 1202 and packet headers 1204.

Figure 13:
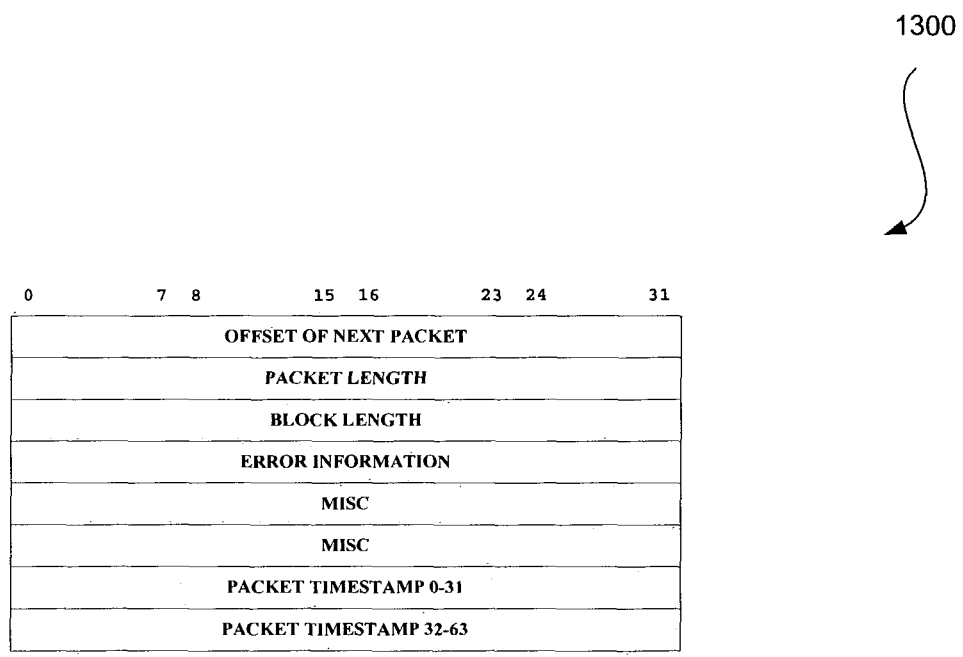
FIG. 13 illustrates the various packet attributes and packet control information that may be situated in a packet header with a format like the one shown in FIG. 12.

As shown, there are one or more packet data 1202 in a super block. Each packet data 1202 has an assigned packet header 1204. The packet header 1204 contains packet attributes and packet control information. FIG. 13 illustrates the various packet attributes and packet control information 1300 that may be situated in a packet header of a super block like the one shown in FIG. 12.

Such exemplary packet attributes of each packet header 1204 are as follows in Table 4. As an option, each item may be 32 bits wide, or any other desired length.

TABLE 4

Figure 14:
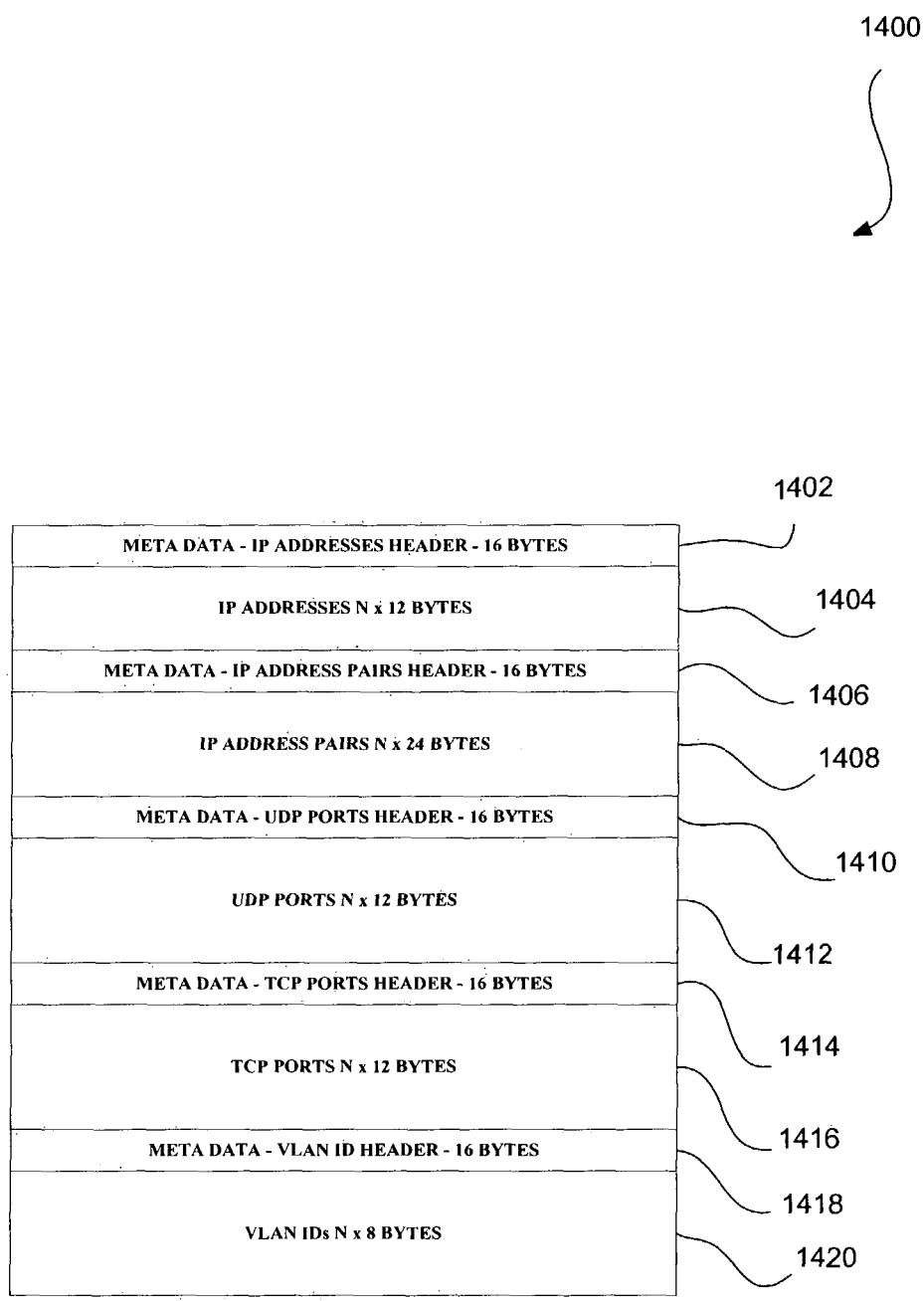
FIG. 14 illustrates one exemplary meta data format with which packets are communicated between a network processor of an adapter and an external memory of a host computer mother board, in accordance with one embodiment.

Packet Length
Packet Timestamp
Error Information
Packet Data-Block length
Link Pointers to next packet within super block FIG. 14 illustrates one exemplary meta data format 1400 with which packets are communicated between the network processor 614 and the external memory 508 of the computer mother board 502, in accordance with one embodiment. While the present exemplary meta data format 1400 is set forth in the context of the adapter 600 of FIG. 6 and computer mother board 502 of FIG. 5, the present meta data format 1400 may be implemented in any desired context.

As shown, a meta data IP addresses header component 1402, a meta data IP address entry component 1404, a meta data IP address pairs header component 1406, a meta data IP address pair entry component 1408, a meta data UDP ports header component 1410, a meta data UDP port entry component 1412, a meta data TCP ports header component 1414, a meta data TCP port entry component 1416, a meta data VLAN header component 1418, and a meta data VLAN IDs entry component 1420.

Figure 14A:
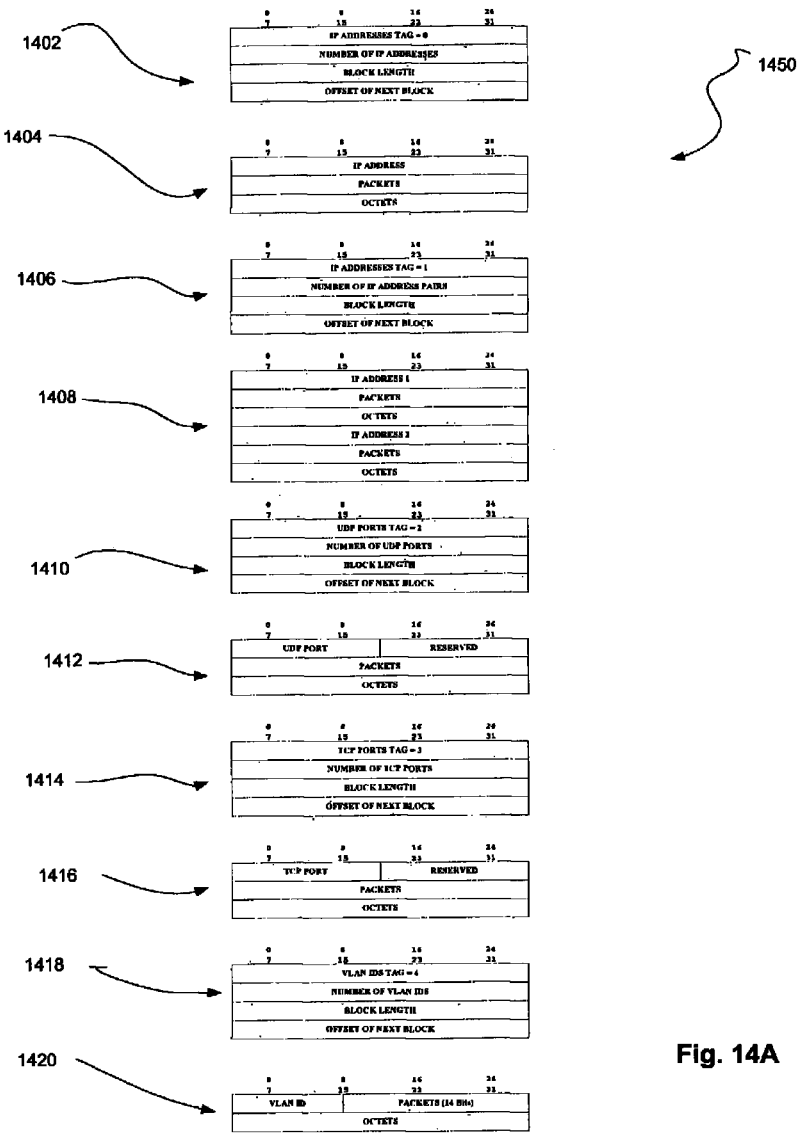
FIG. 14A illustrates exemplary formats associated with the various meta data components set forth in FIG. 14, in accordance with one embodiment.

FIG. 14A illustrates exemplary formats 1450 associated with the various meta data components set forth in FIG. 14, in accordance with one embodiment. While the present exemplary formats 1450 are set forth in the context of the meta data format 1400 of FIG. 14, the present exemplary formats 1450 may be implemented in any desired context.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A network processor system for scanning data received from a computer network, comprising:
    a central processing unit for processing data;
    a network processor including processor hardware separate from the central processing unit, the network processor coupled between the central processing unit and a network, the network processor capable of scanning data received from the network based on an update;
    wherein the network processor is capable of receiving the update via the network, wherein the network processor is a component of a network interface circuit board coupled to the central processing unit.

2. The system as recited in claim 1, wherein the update includes a plurality of regular expressions.

3. The system as recited in claim 1, wherein the scanning includes scanning the data for viruses.

4. The system as recited in claim 1, wherein the scanning is executed utilizing drivers installed on the network processor.

5. The system as recited in claim 4, wherein the drivers include negative drivers.

6. The system as recited in claim 5, wherein the negative drivers include rules for conditionally scanning data based on a type thereof.

7. The system as recited in claim 1, wherein the update is received automatically.

8. A method for scanning data received from a computer network, comprising:
    receiving data with a network processor including processor hardware separate from a central processing unit, the network processor coupled between the central processing unit and a network; and
    scanning the data received from the network based on an update, utilizing the network processor;
    wherein the network processor is capable of receiving the update via the network, wherein the network processor is a component of a network interface circuit board coupled to the central processing unit.

9. The method as recited in claim 8, wherein the update includes a plurality of regular expressions.

10. The method as recited in claim 8, wherein the scanning includes scanning the data for viruses.

11. The method as recited in claim 8, wherein the scanning is executed utilizing drivers installed on the network processor.

12. The method as recited in claim 11, wherein the drivers include negative drivers.

13. The method as recited in claim 12, wherein the negative drivers include rules for conditionally scanning data based on a type thereof.

14. The method as recited in claim 8, wherein the update is received automatically.

15. A computer program product embodied on a tangible, non-transitory, computer readable medium for scanning data received from a computer network, comprising:
    computer code for receiving data with a network processor including processor hardware separate from a central processing unit, the network processor coupled between the central processing unit and a network; and
    computer code for scanning the data received from the network based on an update, utilizing the network processor;
    wherein the network processor is capable of receiving the update via the network, wherein the network processor is a component of a network interface circuit board coupled to the central processing unit.

16. The computer program product as recited in claim 15, wherein the update includes a plurality of regular expressions.

17. The computer program product as recited in claim 15, wherein the scanning includes scanning the data for viruses.

18. The computer program product as recited in claim 15, wherein the scanning is executed utilizing drivers installed on the network processor.

19. The computer program product as recited in claim 18, wherein the drivers include negative drivers.

20. The computer program product as recited in claim 19, wherein the negative drivers include rules for conditionally scanning data based on a type thereof.

21. The computer program product as recited in claim 15, wherein the update is received automatically.

22. A network processor system for scanning data received from a computer network, comprising:
    a central processing unit for processing data;
    a network processor including processor hardware separate from the central processing unit, the network processor coupled between the central processing unit and a network, the network processor capable of scanning data received from the network;
    a plurality of drivers installed on the network processor for conditionally scanning data based on a type thereof, wherein the network processor is a component of a network interface circuit board coupled to the central processing unit.

* * * * *